United States Patent [19]

Soubrier et al.

[11] Patent Number: 5,024,645
[45] Date of Patent: Jun. 18, 1991

[54] APPARATUS FOR POSITIONING A PORT IN AN APERTURE IN A WEB OF FILM

[75] Inventors: Pierre Soubrier, Villecresnes, France; Xavier Denis, Tournai, Belgium

[73] Assignee: Baxter International Inc., Deerfield, Ill.

[21] Appl. No.: 358,281

[22] Filed: May 26, 1989

[51] Int. Cl.$^5$ ............... B31B 23/84; B65G 47/84
[52] U.S. Cl. ................... 493/380; 493/213; 156/552; 198/463.3; 198/631; 227/111; 227/135
[58] Field of Search ............ 493/213, 345, 348, 380; 156/519, 521, 552; 198/463.3, 631; 227/107, 111, 135, 136, 137

[56] References Cited

U.S. PATENT DOCUMENTS

| | | | |
|---|---|---|---|
| 2,859,670 | 11/1958 | Rawe | 493/213 |
| 3,069,303 | 12/1962 | Scholle | 156/253 |
| 3,434,908 | 3/1969 | MacDonald | 156/514 |
| 3,553,934 | 1/1971 | Johnson et al. | 53/183 |
| 3,737,021 | 6/1973 | Reth et al. | 198/463.3 |
| 3,783,080 | 1/1974 | Goglio | 156/514 |
| 3,812,572 | 5/1974 | Weikert | 29/208 |
| 3,821,046 | 6/1974 | Runge | 156/69 |
| 4,027,577 | 6/1977 | Thompson | 93/25 |
| 4,246,062 | 1/1981 | Christine | 156/498 |
| 4,566,250 | 1/1986 | Matsumura et al. | 53/128 |
| 4,709,528 | 12/1987 | Merkus | 53/128 |
| 4,779,397 | 10/1988 | Christine et al. | 53/410 |

FOREIGN PATENT DOCUMENTS

| | | | |
|---|---|---|---|
| 478421 | 11/1951 | Canada | 198/631 |
| 836904 | 3/1970 | Canada | 198/631 |

Primary Examiner—William E. Terrell
Attorney, Agent, or Firm—Paul E. Schaafsma; Amy L. H. Rockwell; Paul C. Flattery

[57] ABSTRACT

An apparatus for positioning a port within an aperture of a web of film, including a chain loop having a plurality of forks for releasably retaining ports. The chain loop is fed around a first, a second, and a third rotatable sprocket. The first and second rotatable sprockets are coupled to a frame and located in a substantially aligned relationship to each other, perpendicular to a portion of the film, the third sprocket is located at a position offset from a plane defined by the first and second sprockets. The first and second sprockets can be moved from a first position to a second position and from the second position to the first position. During operation, the rotation of the third sprocket is releasably prevented, to accurately regulate the rotation of the first sprocket an indexer is provided.

24 Claims, 3 Drawing Sheets

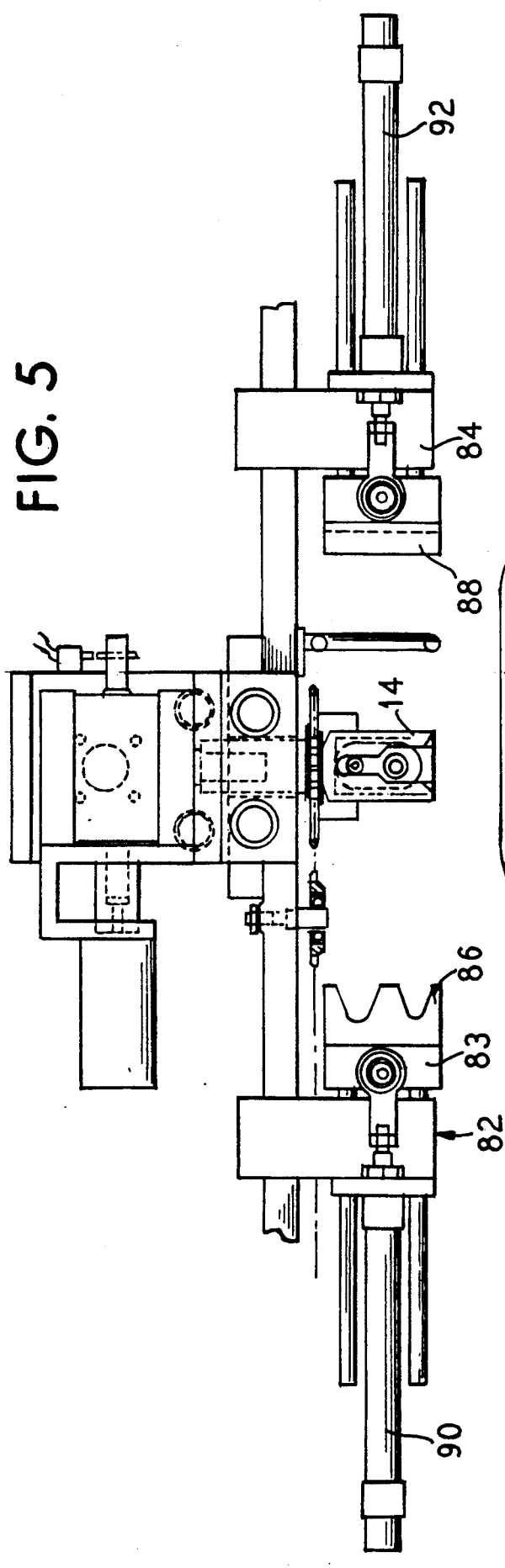
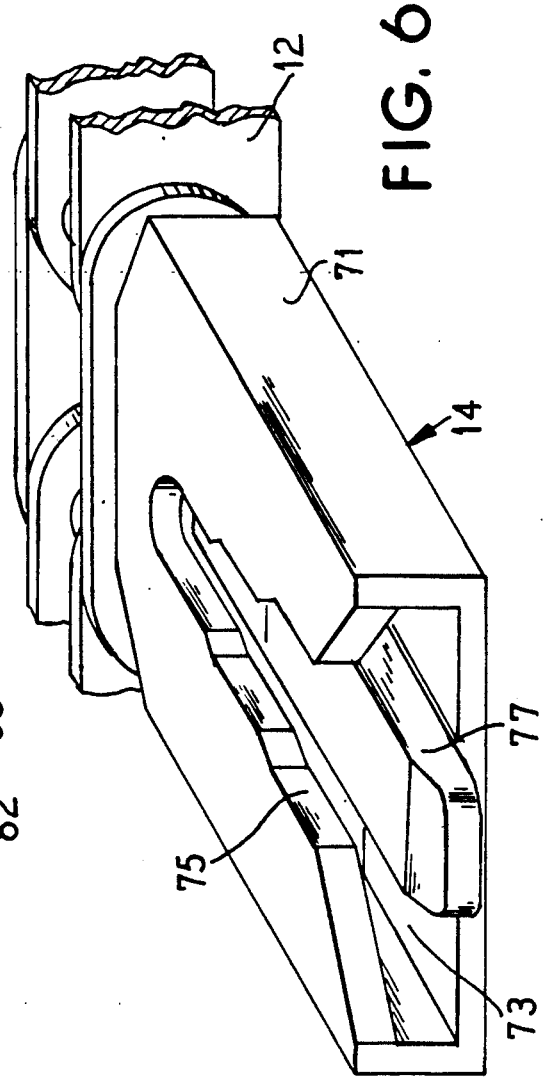

5,024,645

APPARATUS FOR POSITIONING A PORT IN AN APERTURE IN A WEB OF FILM

BACKGROUND OF THE INVENTION

The present invention relates to apparatus and methods for positioning a port in an aperture in a web of film in a packaging machine.

Packaging machines are utilized to package a variety of products in flexible containers. One method for packaging a product in a flexible container is to utilize a form, fill, seal packaging machine. To this end, form, fill, seal packaging machines are utilized to seal pharmaceuticals, dairy products, wine, food stuffs, cosmetics, and other products in flexible containers. The form, fill, seal packaging machine provides an apparatus for packaging these products in an expedient manner.

In one type of form, fill, seal packaging machine, a web of heat sealable film is passed over a former or mandrel that forms the film into a tubular shape. To effect a tubular shape, the film is folded longitudinally and heat sealed along abutting longitudinal edges. The tubular-shaped film is then passed around a tubular fill system that deposits the product to be packaged into the tubular-shaped film. To create individual packages (hereinafter "bags"), the web of film must be sealed across its width. These side seals are typically created by a sealer that creates the second seal for one bag while making the first seal for the next bag. After the side seals are created, the web of film can then be severed between the side seals to create individual bags.

In certain arts, and for certain packaging needs, it is necessary to create flexible containers filled with fluids that have attached thereto ports. As used herein, the term "ports" includes, without limitation, fitments, valves, and other means for accessing the fluid contained within the container. The ports provide a means for accessing the container, either utilizing a spike or needle, or through a valve located on the port. The ports typically include a tubular portion for receiving a spike or needle. The tubular portion extends from a base or flange that is sealed to a web of film.

In one method for creating flexible containers having ports in a form, fill, seal packaging machine, during the form, fill, seal process the web of film is punched by means for creating an opening or aperture in the film. To secure the port to the film, the tubular portion of the port is positioned within the opening and the base is sealed to the web of film. It should be noted, however, that the film can be prepunched and fed into the packaging machine in a prepunched state.

As stated above, to seal the fitments to the film, the fitments must be delivered in juxtaposition to the film and the ports inserted through the openings or apertures in the film. It is known to deliver ports from a storage area to a conveying mechanism, such as a chain loop having a plurality of forks for releasably retaining the ports and by utilizing a number of pneumatic cylinders to move the ports from the chain loop and insert them into an aperture in the film. See, for example, PCT published patent application PCT/FR87/00169. For example, the unit might use two pneumatic cylinders to move the port first away from the conveying mechanism and then toward and through a hole in the film. This results in a three-step process of moving the ports to the elevator, transferring the ports to the elevator, and then urging a port upwardly into an aperture in the film.

This prior method can result in the misalignment of the ports in the aperture in the web of film and difficulty in transferring the port from the apparatus to the film. Accordingly, the process can result in ports not being properly aligned in the film or with respect to the aperture in the web of film and therefore, when the ports are sealed to the film, a secure seal may not be effectuated or the ports may be misaligned within the film.

There is therefore a need for an improved method and apparatus for positioning a port in an aperture in a web of film so that the port can be sealed thereto.

SUMMARY OF THE INVENTION

The present invention provides an apparatus and method for delivering a port to an aperture in a web of film and inserting same therethrough. The method maintains the integrity of the original alignment of the port. Pursuant to the method, once the ports are aligned within the apparatus, they are maintained in their initial position and not transferred from same until they are inserted into an aperture in the film. The port, once so received within an aperture in the film, is removed from the apparatus due to the flow of the film through the packaging machine.

The apparatus for positioning a port in an aperture in a web of film, in an embodiment, includes a transporting means having a plurality of means for releasably retaining a port. At least a first rotatable means and a second rotatable means are provided, the transporting means is fed around the first and second rotatable means when the first and second rotatable means rotate. The first rotatable means includes means for accurately regulating the rotation of the first rotatable means. The apparatus also includes means for causing the first rotatable means, and thereby a portion of the chain, to move toward and away from a portion of the web of film.

In an embodiment, the apparatus includes brake means for preventing the rotation of the second rotatable means.

In an embodiment, a third rotatable means is provided around which the transporting means is also fed. The third rotatable means is preferably coupled to the first rotatable means so that it is substantially aligned with the first rotatable means substantially perpendicular to a portion of the web of film.

In an embodiment, the apparatus for positioning a port within an aperture in a web of film comprises a chain loop including a plurality of forks, each fork releasably retaining a port. The apparatus includes at least a first, a second, and a third rotatable sprocket around which the chain loop is fed. The first and second rotatable sprockets are coupled to a frame and located in a substantially aligned relationship to each other substantially perpendicular to a portion of the film. The third sprocket is located at a position offset from a plane defined by the first and second sprockets. Means for moving the first and second sprockets from a first position to a second position and from the second position to the first position are provided. Further, the apparatus includes means for releasably preventing the rotation of the third sprocket and means for accurately regulating the rotation of the first sprocket.

In an embodiment, the means for moving the first and second sprocket includes a piston.

In an embodiment, the third sprocket is located in a plane that is substantially perpendicular to the plane defined by the first and second sprockets.

In an embodiment, the means for accurately regulating the rotation of the first sprocket includes an indexer.

In an embodiment, a station for positioning a port within a fork of the chain loop is provided; the station for positioning being located between the first and third sprocket.

The present invention also provides a method for attaching a port to a web of film. The method comprises the steps of: positioning a port in a fork coupled to a continuous chain that is fed around at least a first, second, and third sprocket, the first and second sprockets being coupled in a substantially aligned position; causing the first sprocket to insert a port within an aperture in a web of film; preventing the rotation of the third sprocket; causing the film to remove the port from the fork; causing the first and second sprockets to move away from a portion of the film and a second port to be positioned at a top portion of the first sprocket; preventing the rotation of the first sprocket and allowing the third sprocket to rotate; and moving the first and second sprocket toward the film so that the second port is received in an opening in the film.

In an embodiment of the method, the first and second sprocket are caused to move away from the portion of the film by rotating the first sprocket a predetermined rotational distance.

Accordingly, an advantage of the present invention is to provide an apparatus for accurately positioning a port within an aperture in a web of film.

Furthermore, an advantage of the present invention is to provide an apparatus that once the port is aligned in the apparatus, the integrity of the original alignment of the port with respect to the apparatus is maintained.

Still, an advantage of the present invention is to provide an essentially one-step process for inserting a port within an opening in a web of film.

Moreover, an advantage of the present invention is to provide an apparatus that allows, if an operator is utilized, the operator sufficient time to position a port in the apparatus for inserting the port within an opening in a web of film.

Furthermore, an advantage of the present invention is that it provides an apparatus that for the majority of the time of a cycle of the packaging machine, is not in movement.

Further, an advantage of the present invention is to provide an improved method for inserting ports into an aperture of a web of film, in a form, fill, seal packaging machine.

Another advantage of the present invention is that it provides an apparatus for inserting a port in a web of film that can be utilized in a form, fill, seal packaging machine for making flexible containers having ports extending therefrom.

Additional features and advantages of the present invention are described in, and will be apparent from, the detailed description of the presently preferred embodiments and from the drawings.

BRIEF DESCRIPTION OF THE DRAWINGS

FIG. 5 illustrates a top elevational view of a portion of the apparatus of FIG. 2.

FIG. 6 illustrates a perspective view of an embodiment of a fork, for retaining a port, of the present invention.

DETAILED DESCRIPTION OF THE PRESENTLY PREFERRED EMBODIMENTS

The present invention provides an improved method and apparatus for delivering ports to a web of film and inserting same through an aperture in the web of film. Pursuant to the apparatus and method of the present invention, once the ports are placed in an initial position on the apparatus, either automatically or by an operator, the ports maintain their initial position relative to the apparatus until inserted through an aperture in the film. As used herein, the term "aperture" refers to a hole or opening in a web of film that is created in the film so that the film can accept at least a portion of a port so that the port can be sealed to the film.

The apparatus of the present invention, although, in the embodiment illustrated, is utilized in a form, fill, seal packaging machine, can be utilized in other packaging machinery or with other apparatus for attaching a port to a web of film. As used herein, "form, fill, seal packaging machine" means a machine for creating from a flexible web of film a bag for housing a product.

Figure 1:
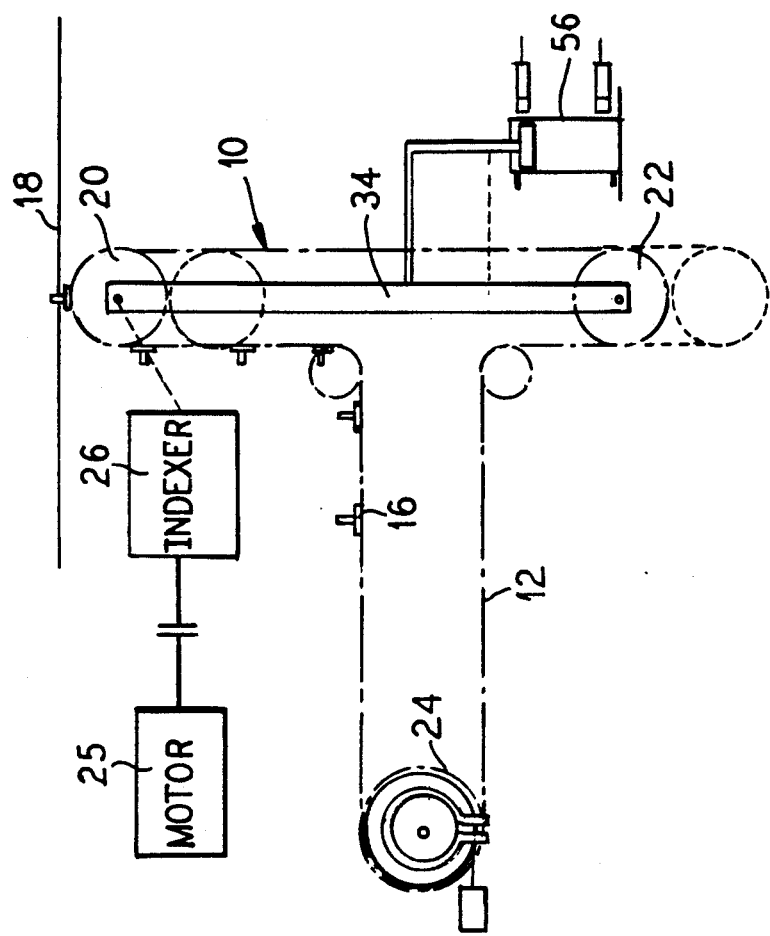
FIG. 1 illustrates, diagrammatically, an embodiment of the apparatus of the present invention.

Referring to FIG. 1, the present invention is schematically illustrated. Briefly, the present invention, in the preferred embodiment illustrated, includes, when the apparatus 10 is in the position illustrated in FIG. 1, a substantially T-shaped continuous chain structure 12. The chain structure 12 provides a plurality of forks 14; each fork 14 releasably retains a port 16. Pursuant to the method and apparatus 10 of the present invention, the ports 16 are positioned in the forks 14 and maintained on the chain 12 and delivered by the chain to a web of film 18.

To deliver the ports to the web of film 18, three principle sprockets or pinions 20, 22, and 24 are provided. The first sprocket 20 is driven by a motor 25 and an indexer 26. The indexer 26 ensures that the first sprocket 20 is accurately rotated thereby accurately indexing the chain 12. As discussed in more detail below, this causes the ports 16 to be accurately aligned with an aperture in the web of film 18. The second sprocket 22 is coupled to the first sprocket 20 by a frame structure 34 and, as discussed in detail below, moves up and down with the first sprocket to position the port 16 and drive the chain 12. The third sprocket 24 functions as an idler sprocket and includes a brake to releasably prevent rotation of the third sprocket. These features, and their function, will be discussed in more detail below.

Figure 2:
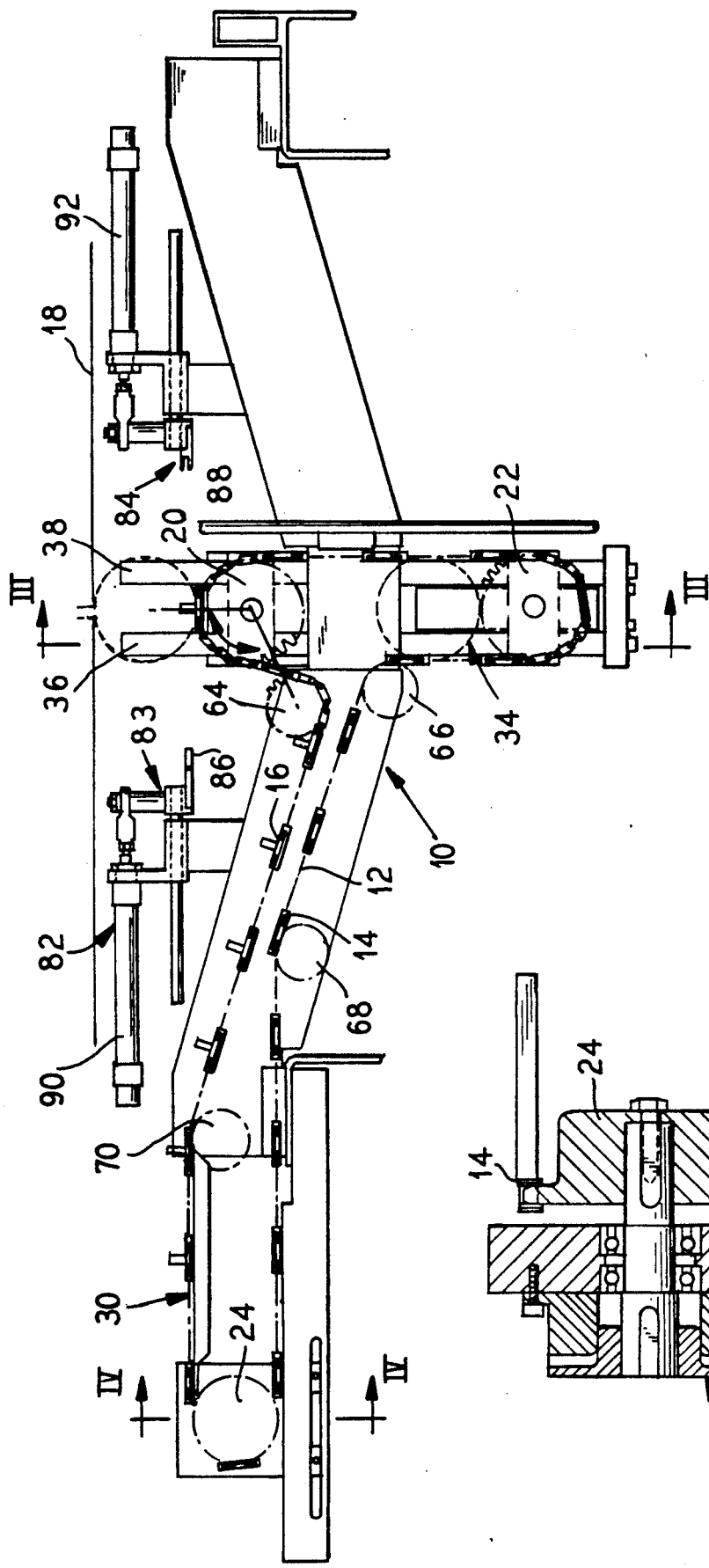
FIG. 2 illustrates a cross-sectional perspective view of an embodiment of the apparatus of the present invention.

Referring how to FIG. 2, the apparatus 10 of the present invention functions to not only transport a port 16 from a storage location to a position where it can be inserted in an aperture in a web of film 18, but also functions to insert the port 16 in the aperture. The apparatus 10 includes a continuous chain loop 12. Although in the preferred embodiment a continuous chain loop 12 is utilized, it should be appreciated that other means for transporting the ports 16 can be utilized. The chain 12 is fed, around at least sprockets 20, 22, and 24; the sprockets cause the ports 16 to move in a similar direction to that of the flow of the web of film 18. Accordingly, in the embodiment illustrated, the sprockets 20, 22, and 24 rotate in a clockwise direction.

The apparatus 10 includes a port positioning station 30 wherein a port 16 can be positioned within a fork 14. The forks 14 function to releasably retain the ports 16. The ports 16 can be positioned within the forks 14 at the port positioning station 30, either by an operator or automatically. Once so positioned, the ports 16 are transported by the chain 12 so that they can be positioned in an aperture in the web of film 18.

FIG. 6 illustrates an embodiment of a fork 14 that can be utilized in the present invention. The fork 14 insures that the port 16 is accurately positioned on the chain 12 and is delivered to an aperture in the web of film 18 while the integrity of its original position is maintained. The fork 14 allows the port 16 to be removed from the fork after it is received within the aperture of the web of film 18 due to the movement of the film.

To this end, the fork 14 includes a body 71 that defines a channel 73. A slot-like aperture 75 is provided for allowing a base of the port 16 to be received within the channel 73. A biasing member 77 is provided for properly positioning the base, and thereby the port 16, with respect to the fork 14. In the embodiment illustrated, the biasing member 77 is a tongue that extends for a length of the channel 73.

The fork 14 provides a means for releasably retaining the port in juxtaposition to the chain. The biasing member 77 insures that the port 16 is properly positioned with respect to the fork 14. The fork 14, however, allows the port 16 to be easily removed therefrom due to the flow of film when the port is inserted into an aperture of the film.

The chain structure 12, along with the forks 14 and ports 16, is driven by the first sprocket 20. To this end, the first sprocket 20 is driven by the motor 25 and indexer 26. The indexer 26 functions to accurately regulate the rotational movement of the first sprocket 20. As discussed in more detail, infra, this ensures that the chain 12 is properly indexed ensuring that the port 16 will be aligned with an aperture in the web of film 18. A Camco Indexer has been found to function satisfactorily as the indexer 26.

A second sprocket 22 is provided that functions as an idler sprocket. Accordingly, the second sprocket 22 does not drive the chain 10 but rather functions to define, in part, the path of travel of the chain 12.

Figure 3:
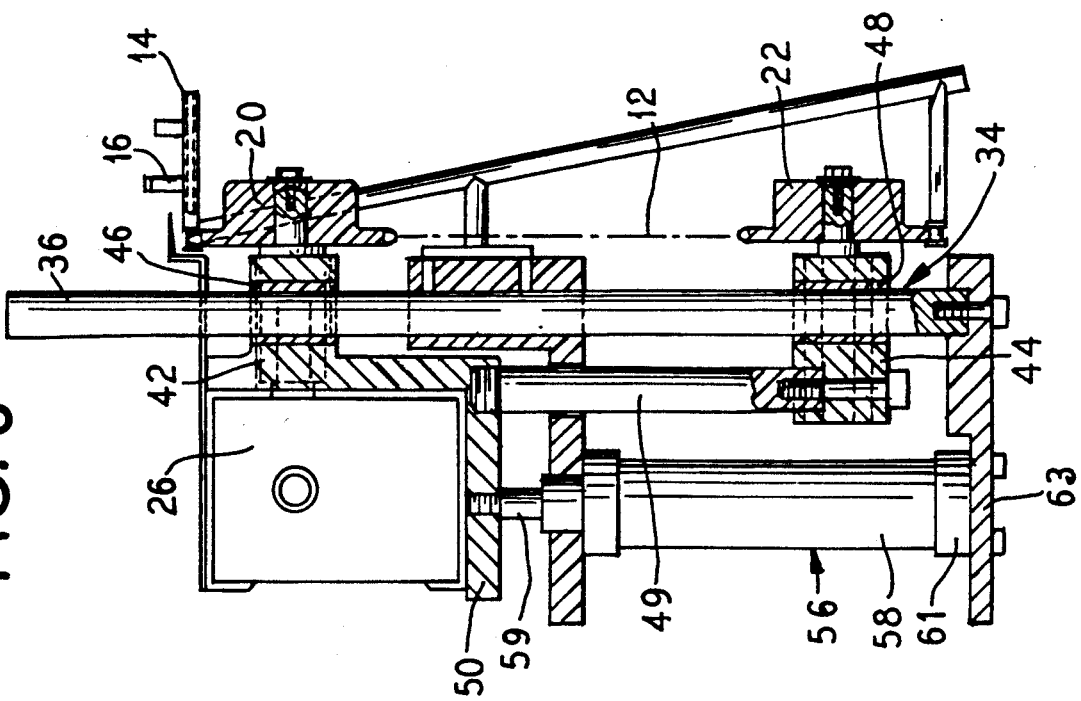
FIG. 3 illustrates a cross-sectional view of the apparatus illustrated in FIG. 2 taken along lines III—III of FIG. 2.

As illustrated in FIGS. 1, 2, and 3, the first sprocket 20 and second sprocket 22 are coupled together by a frame structure 34. The frame 34 couples the first sprocket 20 and second sprocket 22 so that they are substantially aligned in a position that is substantially perpendicular to a portion of the web of film 18. To this end, the frame 34 includes two fixed guide rods 36 and 38 to which each of the first sprocket 20 and second sprocket 22 are coupled.

The first sprocket 20 and second sprocket 22 are coupled to the guide rods 36 and 38 so as to allow movement of the sprockets 20 and 22 with respect to the guide rods. In this regard, the sprockets 20 and 22 are coupled to brackets 42 and 44, respectively. Each of the brackets 42 and 44 include bushings 46 and 48, respectively, allowing the brackets, and thereby the first and second sprockets 20 and 22, to move along the fixed guide rods 36 and 38. The brackets 42 and 44 are coupled together by a fixed rod 49.

As illustrated, bracket 42 also includes a housing 50 upon which the indexer 26 and motor 25 are mounted. This allows the indexer 26 and motor 25 to move with the first sprocket 20.

As also illustrated, specifically in FIG. 3, a piston 56 is provided. The piston 56 includes a cylinder 58 and piston rod 59 One end 61 of the cylinder rests on a plate 63 to which an end of each of the guide rods 36 and 38 is secured. The piston rod 59 is coupled to the housing 50. Therefore, upon movement of the piston 56, the fixed rod 40 and brackets 42, 44, and thereby the first and second sprockets 20 and 22 are moved along the guide rods 36 and 38.

Due to the construction of the frame 34 and piston 56, both the first and second sprockets 20 and 22 will move as a unit, either away from, or towards, a portion of the web of film 18. As set forth below in the discussion on the operation of the apparatus 10, this, in part, affords the apparatus 10 the ability to accurately position a port 16 with respect to an aperture in the web of film 18, allowing the first sprocket 20 to position the port within the aperture.

Figure 4:
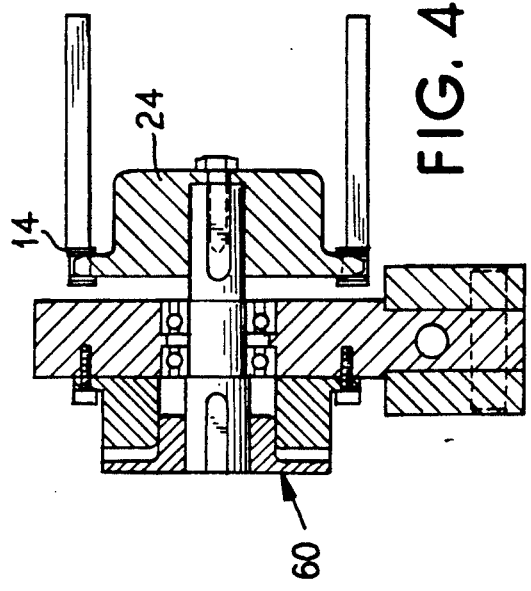
FIG. 4 illustrates a cross-sectional view of the apparatus of FIG. 2 taken along lines IV—IV of FIG. 2.

Referring to FIGS. 2 and 4, a third sprocket 24 is provided. The third sprocket 24, similar to the second sprocket 22, essentially functions as an idler sprocket. As illustrated in FIG. 4, the third sprocket 24 includes a brake member 60 for releasably preventing the rotation of the third sprocket 24.

In the preferred embodiment of the apparatus 10 illustrated in FIG. 2, four additional sprockets or pinions 64, 66, 68, and 70 are provided. The sprockets 64, 66, 68, and 70 are also idler sprockets. The sprockets 64, 66, 68, and 70 allow the chain loop 12 to travel in a path that is not entirely parallel to the flow path of the film 18.

Referring specifically to FIGS. 2 and 5, the sprockets 64, 66, 68, and 70 allow the apparatus 10 to provide, in the embodiment illustrated, realignment clamp means 82. The realignment clamp means 82 insures that the port 16 is correctly positioned in a fork 14 at a top portion of the first sprocket 20 prior to the first sprocket 20 urging the port into an aperture in the web of film 18. It should be noted, however, that the realignment clamp means 82 may not be needed, depending on the fork structure utilized. In this regard, the inventors of the present invention believe that if the fork 14 illustrated in FIG. 6 is utilized that the realignment clamp means 82 may not be necessary.

The realignment clamp means 82 includes two clamp members 83 and 84 located on opposing sides of the first sprocket 20. The clamp members 83 and 84 include port alignment members 86 and 88, respectively. In use, when the port 16 is in a position as illustrated in solid lines in FIG. 2, the realignment clamp means 82 can be actuated causing the port alignment members 86 and 88 to contact the port.

The port alignment members 86 and 88 are so constructed and arranged that they center the port 16 within the fork 14. Accordingly, if, for some reason, the port 16 became misaligned within the fork 14, or was not properly positioned therein originally, the clamp means 82 will ensure that the port 16 is correctly positioned. To cause the port alignment members 86 and 88 to contact the port 16, piston members 90 and 92 are provided for actuating the clamp members 83 and 84.

In use, the apparatus 10 functions as follows. The phantom lines in FIG. 2 illustrate the port 16 in a position where it will be taken away by the web of film 18 after it has been inserted within an aperture in the film. At this time, the brake 60 is actuated on the third sprocket 24. Once the port has been removed from the fork 14, the indexer 26 and motor 25 cause the first sprocket 20 to rotate a predetermined rotational distance. This distance causes the chain 12 to be indexed, i.e., moved, a certain distance. In a presently preferred embodiment of the present invention, the first sprocket 20 is indexed, i.e., rotated, by 120°. The distance the chain 12 is indexed and the first sprocket 20 is rotated, corresponds to one bag length of the web of film 18.

Because the third sprocket 24 is prevented from rotating at this time, due to the brake 60, the indexing, i.e., rotation, of the first sprocket 20, causes the frame 34, and thereby the first and second sprockets 20 and 22, respectively, to move downwardly as illustrated in the solid lines in FIG. 2. To assist in this downward movement, the piston 56 can also be actuated causing the frame 34 to move downwardly. This results in the chain 14 being indexed and causing a port 16 to move into the uppermost position on the first sprocket 20 as illustrated in solid lines in FIG. 2.

After this step in the process has been completed, the brake 60 is removed from the third sprocket 24. Fluid is then urged into the cylinder 58 of the piston causing the piston rod 59 to move upwardly urging the frame 34 and the first and second sprockets 20 and 22 to move toward at least a portion of the web of film 18. During this step of the process, the indexer 26 prevents the first sprocket 20 from rotating.

It should be noted that during this process, the web of film 18 will also be fed through the packaging machine. Of course, the apparatus 10, and the process steps of same, are coordinated with the flow of the web of film through the packaging machine. Therefore, during this later step, the web of film 18 will have been advanced so that the upward movement of the first sprocket 20 will cause the port 16 to be received in an aperture in the web of film.

During the step of the process wherein the rotation of the third sprocket 24 is prevented by the brake 60, a port 16 can be placed in a fork 14 at the port positioning station 30. Because the third sprocket 24 cannot rotate, the chain 12 will not move at this time at the port positioning station 30 allowing an easy placement of the port 16 in the fork 14.

Briefly, the process steps of the present invention are as follows: (1) activate the brake 60 on the third sprocket 24; (2) activate the indexer 26 and motor 25 to cause the first sprocket 20 to move a predetermined rotational distance causing the first and second sprockets 20 and 22 to move downwardly; (3) the first and second sprockets 20 and 22 move downwardly causing a port 16 to be indexed in an uppermost position on the first sprocket 20; (4) preventing rotation of the first sprocket 20; (5) deactivating the brake 60 on the third sprocket 24; and (6) activating the piston 56 to cause the first and second sprockets 20 and 22 to move upwardly causing a port 16 to be received within an aperture of the film 18.

Accordingly, the apparatus 10 and method of the present invention provide a direct feed of the port 16 to the web of film 18 so that the alignment of the port is maintained at all times. Because the system is in movement for a very short time, it is easy, if a manual positioning of the port is utilized, for an operator to position a port 16 within a fork 14. This is in contrast to previous methods in which the chain is in motion during most of the process, and therefore, the window within which an operator has to position the port in the fork is very short. In contrast in the present invention, the chain loop, at the port inserter station, only moves when the port is inserted in the film.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An apparatus for positioning ports in an aperture of a web of film comprising:
    transporting means, for transporting a port, including a plurality of means for releasably retaining a port;
    at least a first rotatable means, for rotating to feed said transporting means, and a second rotatable means, for rotating to feed said transporting means, the transporting means being fed around the first and second rotatable means when the first and second rotatable means rotate, the first rotatable means being coupled to indexing means for accurately regulating the rotation of the first rotatable means; and
    means for causing the first rotatable means, and a portion of the transporting means around same, to move automatically repetitively toward and away from a portion of the web of film in a substantially perpendicular direction to the portion of the web of film to position the ports in successive apertures of the film.

2. The apparatus of claim 1 wherein the means for moving the first rotatable means toward and away from the web of film includes a piston coupled to the first rotatable means.

3. The apparatus of claim 1 including means for preventing the rotation of the second rotatable means.

4. The apparatus of claim 1 including a third rotatable means, around which the transporting means is fed, coupled to the first rotatable means and substantially aligned with the first rotatable means substantially perpendicular to a portion of the web of film.

5. The apparatus of claim 1 wherein the transporting means includes a continuous chain loop.

6. An apparatus for positioning a port within an aperture in a web of film comprising:
    a chain loop including a plurality of means for releasably retaining a port; and
    at least three rotatable sprockets around which the chain is fed, a first and second sprocket being coupled together in a substantially aligned position substantially perpendicular to a portion of the web of film, means for causing the first and second sprocket to move together away from the portion of the web of film, in a substantially perpendicular direction to the portion of the film, and means for causing the first and second sprocket to move together toward the portion of the web of film, in a substantially perpendicular direction to the portion of the film to position the ports in successive apertures of the film.

7. The apparatus of claim 6 wherein the means for causing the first and second sprocket to move away from the portion of the web of film includes a brake for preventing the rotation of the third sprocket.

8. The apparatus of claim 6 wherein the means for causing the first and second sprocket to move toward the portion of the web of film includes a piston.

9. The apparatus of claim 6 including means for accurately regulating the rotation of the first sprocket.

10. The apparatus of claim 6 including a port insertion station, for allowing the insertion of ports into the means for releasably retaining the ports, located between the first and third sprockets.

11. The apparatus of claim 9 wherein the means for accurately regulating the rotation of the first sprocket is an indexer coupled to a motor.

12. The apparatus of claim 6 including port realignment means for accurately positioning the port in the fork before it is inserted in the aperture in the film.

13. The apparatus of claim 12 including at least a fourth rotatable sprocket for defining a flow path for the chain loop that allows placement of the port realignment means near the first sprocket.

14. The apparatus of claim 6 wherein:
the means for releasably retaining the port is a fork having a body defining a channel for receiving a portion of the port.

15. The apparatus of claim 14 wherein the channel includes biasing means for biasing the portion of the port received in the channel toward an upper portion of the fork.

16. An apparatus for positioning a port within an aperture of a web of film comprising:
a chain including a plurality of forks for releasably retaining ports;
at least a first, a second, and a third rotatable sprocket around which the chain is fed, the first and second rotatable sprockets being coupled to a frame and located in a substantially aligned relationship to each other, perpendicular to a portion of the film, the third sprocket being located at a position offset from a plane defined by the first and second sprockets;
means for moving the first and second sprockets from a first position to a second position and from the second position to the first position to position the ports in successive apertures of the film, the first and second sprockets are aligned substantially perpendicular to the portion of the film;
means for releasably preventing the rotation of the third sprocket; and
means for accurately regulating the rotation of the first sprocket.

17. The apparatus of claim 16 wherein the means for moving the first and second sprocket includes a piston.

18. The apparatus of claim 16 wherein the third sprocket is located in a plane that is perpendicular to the plane defined by the first and second sprockets.

19. The apparatus of claim 16 including a station, for positioning a port within the fork, located between the first and third sprocket.

20. The apparatus of claim 16 wherein the means for accurately regulating the rotation of the first sprocket is an indexer coupled to a motor.

21. The apparatus of claim 16 including port realignment means for accurately positioning the port in the fork before it is inserted in an aperture in the film.

22. The apparatus of claim 21 including at least a fourth rotatable sprocket for defining a flow path for the chain loop that allows placement of the port realignment means near the first sprocket.

23. The apparatus of claim 16 wherein:
the fork for releasably retaining the port includes a body defining a channel for receiving a portion of the port.

24. The apparatus of claim 23 wherein the channel of the fork includes biasing means for biasing the portion of the port received in the channel toward an upper portion of the fork.

* * * * *